(12) United States Patent
Klauke et al.

(10) Patent No.: US 9,619,502 B2
(45) Date of Patent: *Apr. 11, 2017

(54) COMBINING ROW BASED AND COLUMN BASED TABLES TO FORM MIXED-MODE TABLES

(71) Applicant: International Business Machines Corporation, Armonk, NY (US)

(72) Inventors: Joern Klauke, Stuttgart (DE); Thomas Rech, Rittersheim (DE); Jens Seifert, Gaertringen (DE); Calisto P. Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 14/635,378

(22) Filed: Mar. 2, 2015

(65) Prior Publication Data

US 2015/0347484 A1    Dec. 3, 2015

Related U.S. Application Data

(63) Continuation of application No. 14/291,061, filed on May 30, 2014.

(51) Int. Cl.
*G06F 17/30*    (2006.01)

(52) U.S. Cl.
CPC .. *G06F 17/30339* (2013.01); *G06F 17/30315* (2013.01); *G06F 17/30383* (2013.01); *G06F 17/30592* (2013.01)

(58) Field of Classification Search
USPC .................................................. 707/607, 790
See application file for complete search history.

(56) References Cited

U.S. PATENT DOCUMENTS

| | | | | |
|---|---|---|---|---|
| 7,426,559 | B2 * | 9/2008 | Hamel | G06F 17/30578 700/10 |
| 7,614,006 | B2 | 11/2009 | Molander | |
| 9,052,831 | B1 | 6/2015 | Stefani et al. | |
| 2004/0215626 | A1 * | 10/2004 | Colossi | G06F 17/30312 |
| 2005/0210010 | A1 * | 9/2005 | Larson | G06F 17/30522 |
| 2007/0073657 | A1 * | 3/2007 | Santosuosso | G06F 17/30457 |
| 2009/0319581 | A1 * | 12/2009 | Seifert | G06F 17/30312 |
| 2010/0228785 | A1 | 9/2010 | Gaither et al. | |

(Continued)

FOREIGN PATENT DOCUMENTS

| | | |
|---|---|---|
| EP | 2605158 A1 | 6/2013 |
| EP | 2608071 A1 | 6/2013 |

OTHER PUBLICATIONS

US 8,521,784, 08/2013, Ganesh et al. (withdrawn)

(Continued)

*Primary Examiner* — Hung T Vy (74) *Attorney, Agent, or Firm* — David B. Woycechowsky (57) ABSTRACT

Various ways of storing data in tabular form such that some records are stored in a row oriented manner and some data is stored in a column oriented manner. The records respectively stored in the row and column oriented manners may, or may not, overlap (in whole or in part. Some embodiments accomplish this dual orientation of data by: (i) using a range partition; (ii) using a union all view command; and/or (iii) using a first table, a staging table and a materialized query table.

14 Claims, 3 Drawing Sheets

(56) References Cited

U.S. PATENT DOCUMENTS

| | | |
|---|---|---|
| 2012/0166402 A1 | 6/2012 | Pederson et al. |
| 2013/0151491 A1* | 6/2013 | Gislason .......... G06F 17/30339 707/696 |
| 2013/0198168 A1 | 8/2013 | Huang et al. |

OTHER PUBLICATIONS

Färber et al., "The SAP HANA Database—An Architecture Overview", Bulletin of the IEEE Computer Society Technical Committee on Data Engineering, Copyright 2012 IEEE, pp. 1-6.

Schaffner et al., "A Hybrid Row-Column OLTP Database Architecture for Operational Reporting", Business Intelligence for the Real-Time Enterprise (BIRTE 2008), Lecture Notes in Business Information Processing (LNBIP) vol. 27, 2009, pp. 61-74, © Springer-Verlag Berlin Heidelberg 2009.

U.S. Appl. No. 14/291,061 entitled "Combining Row Based and Column Based Tables to Form Mixed-Mode Tables", filed May 30, 2014.

Appendix P—List of IBM Patents or Patent Applications Treated as Related.

* cited by examiner

COMBINING ROW BASED AND COLUMN BASED TABLES TO FORM MIXED-MODE TABLES

BACKGROUND OF THE INVENTION

The present invention relates generally to the field of table data structures (or, simply "tables"), and more particularly to certain ways of combining multiple tables into a single "hybrid table." A relational database management system (RDBMS) is a database management system (DBMS) that is based on a certain relational model. RDBMSes are typically used for the storage of information in new databases used for financial records, manufacturing and logistical information, personnel data, and so on. Relational databases are sometimes used instead of other types of databases, such as legacy hierarchical databases, network databases and object databases.

Relational databases are herein defined to be databases that present a view of data as a collection of rows and columns, whether or not the underlying machine logic is entirely and strictly based upon every tenet of traditional "relational theory."

Query languages are used to "query" databases so that end users (such as database administrators and others) can find selected, relevant data within the context of an (often quite large) database. Most commercial RDBMSes use SQL for their associated "query language." The table(s) of an RDBMS may be stored in either of: (i) a row oriented manner (also sometimes herein referred to as "row based"); or (ii) a column oriented manner (also sometimes herein referred to as "column based"). Row oriented tables are generally used for OLTP (Online transaction processing) applications because row oriented tables are better suited for point queries and updates that add or change only a small amount of data. A single row inserted has one I/O to place the entire row on a single page on disk. On the other hand, column oriented tables are understood to be able to run business intelligence queries faster than on a comparable row oriented table. Unfortunately, inserting or updating a small amount of data in a column oriented table generally takes longer than a comparable change in data would take to be made to a comparable row oriented table. This is mainly because each column is stored separately in a column oriented table and therefore requires separate I/O (input/output addressing) in order to insert or update each column object.

In some known RDBMS products, all the data in a table is separately stored as both of the following: (i) a row oriented table; and (ii) a column oriented table. In this way: (i) types of table accesses that are optimally performed on a row oriented table can be performed on the row oriented version of the table; and (ii) types of table accesses that are optimally performed on a column oriented version of the table can be performed on the column oriented version of the table. It is understood that this type of RMBMS takes significantly more storage space than a comparable RDBMS where only a single version of each table is maintained.

"Hybrid tables" are also known. In a hybrid table, some of the data is stored in a row oriented fashion and some of the data is stored in a column oriented fashion. Here is an example of a conventional hybrid table:

| NAME | AGE | FAVORITE GUM | |
|---|---|---|---|
| Able | 20 | bubble | |
| Baker | 35 | nicotine | |
| Charlie | 50 | mint | |
| NAME | Darla | Edgar | Frank |
| AGE | 22 | 45 | 46 |
| FVT GUM | fruit | licorice | tea berry |

In this example: (i) data associated with Able, Baker and Charlie is stored in a row oriented manner; and (ii) data associated with Darla, Edgar and Frank is stored in a column oriented fashion; and (iii) the table is "hybrid" because there is both row oriented and column oriented data in a single "hybrid table" that is made up of a row table and a column table, with both tables being made up of records having the same attribute fields. The term "hybrid table, as used in this document, will be further explained, below, in the Detailed Description section.

SUMMARY

According to a potential aspect of the present invention, a method for storing data in tabular form includes the following steps (not necessarily in the following order): (i) creating a table with a set of one, or more, partitions such that the table includes at least a first partition range and a second partition range; (ii) populating the first partition range with a first data set that includes a first plurality of records, with each record of the first plurality of records having a plurality of attribute values corresponding to a plurality of ordered attributes; (iii) populating the second partition range with a second data set that includes a second plurality of records, with each record of the second plurality of records having a plurality of attribute values corresponding to a plurality of ordered attributes; and (iv) storing the table as machine readable data on a machine readable storage device. The plurality of ordered attributes of the first plurality of records has the same attributes and the same order as the plurality of ordered attributes of the second plurality of records. The first plurality of records is populated to be row oriented. The second plurality of records is populated to be column oriented.

According to further potential aspects of the present invention, a system and/or computer program product store data in tabular form, with the computer system including: a processor(s) set; and a computer readable storage medium. The processor set is structured, located, connected and/or programmed to run program instructions stored on the computer readable storage medium. The program instructions (which may be stored on the computer program product) include instructions for performing the steps set forth in the previous paragraph. The plurality of ordered attributes of the first plurality of records has the same attributes and the same order as the plurality of ordered attributes of the second plurality of records. The first plurality of records is populated to be row oriented. The second plurality of records is populated to be column oriented.

According to a further potential aspect of the present invention, a method for storing data in tabular form includes the following steps (not necessarily in the following order): (i) creating a first table and a second table; (ii) populating the first table with a first data set that includes a first plurality of records, with each record of the first plurality of records having a plurality of attribute values corresponding to a plurality of ordered attributes; (iii) populating the second table with a second data set that includes a second plurality of records, with each record of the second plurality of records having a plurality of attribute values corresponding to a plurality of ordered attributes; (iv) in response to a union all view command, creating a third table that includes both the first plurality of records and the second plurality of records; and (v) storing the third table as machine readable data on a machine readable storage device. The plurality of ordered attributes of the first plurality of records has the same attributes and the same order as the plurality of ordered attributes of the second plurality of records. The first plurality of records is populated to be row oriented in both the first table and the third table (see definition of "table," below, in the Definitions sub-section of the Detailed Description section). The second plurality of records is populated to be column oriented in both the second table and the third table.

According to further potential aspects of the present invention, a computer program product and/or computer system stores data in tabular form. The computer system includes: a processor(s) set; and a computer readable storage medium. The processor set is structured, located, connected and/or programmed to run program instructions stored on the computer readable storage medium. The program instructions (which may be stored on the computer program product) perform the steps set forth in the previous paragraph. The plurality of ordered attributes of the first plurality of records has the same attributes and the same order as the plurality of ordered attributes of the second plurality of records. The first plurality of records is populated to be row oriented in both the first table and the third table. The second plurality of records is populated to be column oriented in both the second table and the third table.

According to a further potential aspect of the present invention, a method for storing data in tabular form includes the following steps (not necessarily in the following order): (i) providing a first table with an initial data set stored therein, with the initial data set including a first plurality of records, with each record of the first plurality of records having a plurality of attribute values corresponding to a plurality of ordered attributes; (ii) providing a materialized query table with the first plurality of records stored therein; (iii) adding a new record to the first plurality of records stored in the first table; (iv) in response to addition of the new record, recording the addition of the new record to a staging table; and (v) adding the new record to the first materialized query table by replaying the recordation of the addition of the first record from the staging table. An orientation of the first plurality of records as stored in the first table is orthogonal to an orientation of the first plurality of records as stored in the materialized query table.

According to further potential aspects of the present invention, a computer system and/or computer program product store data in tabular form. The computer system includes: a processor(s) set; and a computer readable storage medium. The processor set is structured, located, connected and/or programmed to run program instructions stored on the computer readable storage medium. The program instructions (which can be stored on the computer program product) include instructions for performing the steps set forth in the previous paragraph. An orientation of the first plurality of records as stored in the first table is orthogonal to an orientation of the first plurality of records as stored in the materialized query table.

DETAILED DESCRIPTION

Various embodiments of the present direction are directed to one, or more, of the following ways of creating hybrid tables: (i) range-partitioned table type embodiments ("RPT type" embodiments); (ii) using union-all views and triggers type embodiments (also called "union type embodiments"); and (iii) using column-based materialized query table type embodiments (also called "MQT type embodiments"). Each of these ways will be discussed in further detail below. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
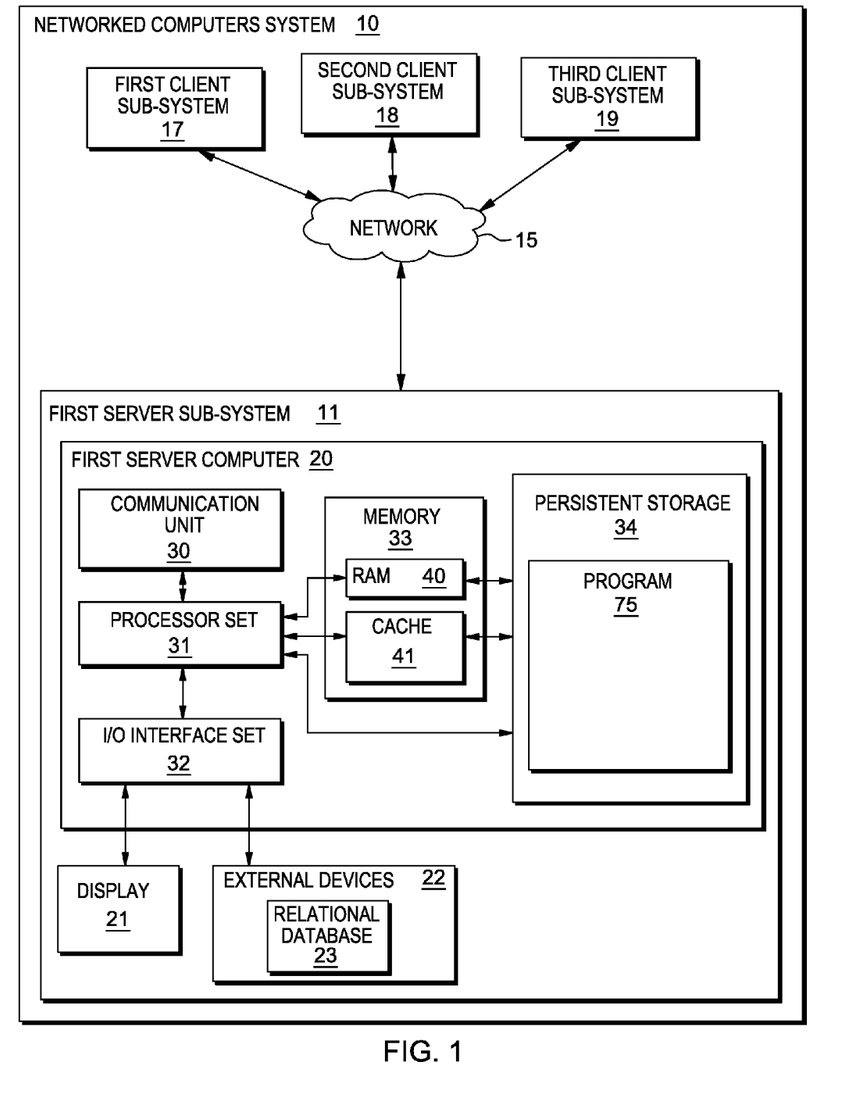
FIG. 1 is a schematic view of a first embodiment of a networked computers system.

An embodiment of a possible hardware and software environment for software and/or methods according to the present invention will now be described in detail with reference to the Figures. FIG. 1 is a functional block diagram illustrating various portions of a networked computers system 10, including: first server sub-system 11; client sub-systems 17, 18, 19; communication network 15; first server computer 20; relational database 23; communication unit 30; processor set 31; input/output (i/o) interface set 32; memory device 33; persistent storage device 34; display device 21; external device set 22; random access memory (RAM) devices 40; cache memory device 41; and program 75.

Sub-system 11 may be a laptop computer, tablet computer, netbook computer, personal computer (PC), a desktop computer, a personal digital assistant (PDA), a smart phone, or any programmable electronic device capable of communicating with the client sub-systems via network 15. Program 75 is a collection of machine readable instructions and/or data that is used to create, manage and control certain software functions that will be discussed in detail, below, in the Example Embodiment sub-section of this Detailed Description section.

Sub-system 11 is capable of communicating with other computer sub-systems via network 15. Network 15 can be, for example, a local area network (LAN), a wide area network (WAN) such as the Internet, or a combination of the two, and can include wired, wireless, or fiber optic connections. In general, network 15 can be any combination of connections and protocols that will support communications between server and client sub-systems.

Sub-system 11 is shown as a block diagram with many double arrows. These double arrows (no separate reference numerals) represent a communications fabric, which provides communications between various components of sub-system 11. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 33 and persistent storage 34 are computer-readable storage media. In general, memory 33 can include any suitable volatile or non-volatile computer-readable storage media. It is further noted that, now and/or in the near future: (i) external device(s) 22 may be able to supply, some or all, memory for sub-system 11; and/or (ii) devices external to sub-system 11 may be able to provide memory for sub-system 11.

Program 75 is stored in persistent storage 34 for access and/or execution by one or more of the respective computer processors 31, usually through one or more memories of memory 33. Persistent storage 34: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 34.

Program 75 may include both machine readable and performable instructions and/or substantive data (that is, the type of data stored in a database). In this particular embodiment, persistent storage 34 includes a magnetic hard disk drive. To name some possible variations, persistent storage 34 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 34 may also be removable. For example, a removable hard drive may be used for persistent storage 34. Other examples include optical and magnetic disks, thumb drives, and smart cards that are inserted into a drive for transfer onto another computer-readable storage medium that is also part of persistent storage 34.

Communications unit 30, in these examples, provides for communications with other data processing systems or devices external to sub-system 11. In these examples, communications unit 30 includes one or more network interface cards. Communications unit 30 may provide communications through the use of either or both physical and wireless communications links. Any software modules discussed herein may be downloaded to a persistent storage device (such as persistent storage device 34) through a communications unit (such as communications unit 30).

I/O interface set 32 allows for input and output of data with other devices that may be connected locally in data communication with server computer 20. For example, I/O interface set 32 provides a connection to external device set 22. External device set 22 will typically include devices such as a keyboard, keypad, a touch screen, and/or some other suitable input device. In system 10, external devices provide the massive amount of non-volatile data storage required to store relational database 23. External device set 22 can also include portable computer-readable storage media such as, for example, thumb drives, portable optical or magnetic disks, and memory cards. Software and data used to practice embodiments of the present invention, for example, program 75, can be stored on such portable computer-readable storage media. In these embodiments the relevant software may (or may not) be loaded, in whole or in part, onto persistent storage device 34 via I/O interface set 32. I/O interface set 32 also connects in data communication with display device 21.

Display device 21 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. EXAMPLE EMBODIMENT

Figure 2:
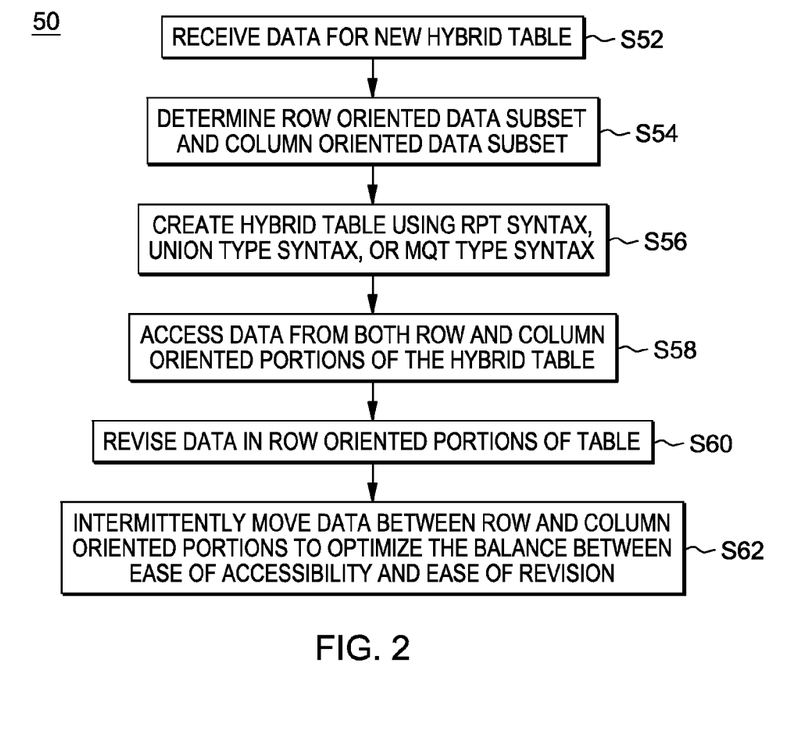
FIG. 2 is a flowchart showing a first method performed, at least in part, by the first embodiment system.
Figure 3:
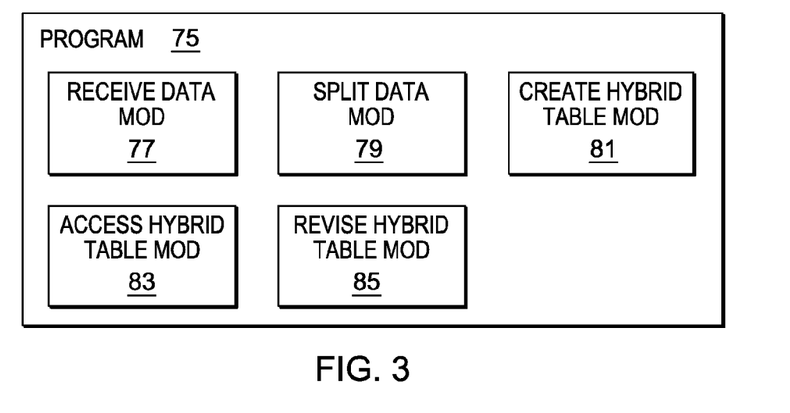
FIG. 3 is a schematic view of a machine logic (for example, software) portion of the first embodiment system.

FIG. 2 shows a flow chart 50 depicting a method according to the present invention. FIG. 3 shows program 75 for performing at least some of the method steps of flow chart 50. This method and associated software will now be discussed, over the course of the following paragraphs, with extensive reference to FIG. 2 (for the method step blocks) and FIG. 3 (for the software blocks). Program 75 is RDBMS and the relational database tables that it manages, creates and controls are relational database 23 (see FIG. 1).

Processing begins at step S52, where receive data module ("mod") 77 receives data, in the form of "records," to be stored in a new "hybrid table." In some embodiments of the present invention, the "hybrid table" will be a single table which has records stored in at least two different orientations which are orthogonal to each other (that is, row oriented and column oriented). In other embodiments, the "hybrid table" will be a single table "view" of multiple tables, where the single view which has records stored in at least two different orientations are orthogonal to each other (that is, row oriented and column oriented). The records will have attribute values according to the same set of ordered attributes (that is row or column headings). For example, the ordered attributes could be "name," "rank," and "serial number," and the attribute values for a given record could be "Able," "Private," and "111-22-3333."

Processing proceeds to step S54 where split data mod 79 selects: (i) a row oriented subset of records from the records received at step S52; and (ii) a column oriented subset of records from the records received at step S52. The two subsets may, or may not, have overlap which is to say that a given record may be selected for the row oriented subset and the column oriented subset. The Further Comments And/Or Embodiments sub-section of this Detailed Description section, below, has further information about how this selection may be made in various embodiments of the present invention.

Processing proceeds to step S56 where create hybrid table mod 81 creates a hybrid table having at least a row oriented portion and a column oriented portion, with the column oriented subset of records being stored in the column oriented portion of the hybrid table, and with the row oriented subset of records being stored in the row oriented portion of the hybrid table. As mentioned above, the hybrid table may be a single table, or it may be a single view of multiple tables. More specifically, the hybrid table may be: (i) an RPT type hybrid table; (ii) a union type hybrid table; or (iii) an MQT type hybrid table. The Further Comments And/Or Embodiments sub-section of this Detailed Description section, below, has further information about each of these three types of hybrid tables.

Processing proceeds to step S58 where access hybrid table mod 83 allows users (for example, users at client sub-systems 17, 18 and 19 as shown in FIG. 1) to access data from the hybrid table. For some user queries, the column oriented portion of the hybrid table may be better for responding to the query.

Processing proceeds to step S60 where revise hybrid table mod 85 allows users (for example, users at client sub-systems 17, 18 and 19 as shown in FIG. 1) to revise data in the hybrid table. More specifically, revisions (such as record insertions and record deletions) are performed on the row oriented portion of the hybrid table so that less computation, processing resources and/or time are required.

Processing proceeds to step S62 where revise hybrid table mod 85 intermittently moves revisions made to the row oriented portion of the hybrid table to the column oriented portion of the hybrid table. The Further Comments And/Or Embodiments sub-section of this Detailed Description section, below, has further information about how the data is moved in each of the three types of hybrid tables.

III. FURTHER COMMENTS AND/OR EMBODIMENTS

Some embodiments of the present invention may include one, or more, of the following features, characteristics and/or advantages: (i) use of certain standard "database objects" and "database features" that are well known in terms of optimization; (ii) use of triggers, views, tables, indexes and/or stored procedures; (iii) a flexible solution in the sense that the structure of the base tables (that is, column based versus row based) can be chosen in a "hybrid database" (that is, a database that supports both types of table structures (row oriented and column oriented); (iv) combines the two different paradigms of row oriented tables and column oriented tables by inserting new data initially in a row oriented version of a table and, subsequently, transferring this data to a column based version of that table; (v) two versions of a table (row oriented and column oriented) are combined in one "union all view" such that an application can transparently select data from either version of the table; (vi) deletions of data are effected in both versions of the table; (vii) rows to be updated for purposes of storage in the column oriented version of the table are deleted from the row oriented version of the table and relocated into the column oriented version of the table; (viii) rows to be updated for purposes of storage in the row oriented version of the table are directly updated; (ix) new data can be inserted almost as fast as in row based tables (one additional index lookup is required to avoid duplicates); (x) business intelligence queries benefit from the column oriented table; (xi) a unique index identifies corresponding rows in both tables; (xii) can be realized "on top of" existing databases because at least some parts of the solution are already implemented in most currently-conventional RDBMS systems; (xiii) large scans of the table can be optimized by incurring I/O for just the columns needed for the query; and/or (xiv) given that values for a particular column pertaining to a domain are similar and tend to give better compression.

The following discussion will discuss three types of embodiments: (i) range-partitioned tables type embodiments ("RPT type" embodiments); (ii) using union-all views and triggers type embodiments (also called "union type embodiments"); and (iii) using column-based materialized query tables type embodiments (also called "MQT type embodiments").

In range-partitioned table type embodiments ("RPT embodiments"), a combination of row oriented and column oriented tables can be realized with a single range partitioned table, such that: (i) frequently updated data is put into a first table partition that is configured to be row-based; and (ii) frequently queried data is put into a second table partition that is configured to be column-based. In some embodiments: (i) the first, row oriented partition will be stored at logical and/or physical addresses that precede those of the second, column oriented partition; (ii) the first row oriented partition (for example, current data) will be much smaller that the second oriented partition (for example, non-current data); and/or (iii) there may be additional partitions (for example, a partition between the second column oriented partition and a third partition that is row oriented, or a partition between the second column oriented partition and a third partition that is column oriented).

Here is an example of a range partitioned table according to an embodiment of the present invention:

| SALE# | DATE | ITEM |
|-------|------|------|
| 8 | 6/1 | hat |
| 9 | 6/8 | pad |

| *** FIRST RANGE PARTITION *** | | | | | | |
|-------|------|------|------|------|------|------|
| SALE # | 1 | 2 | 3 | 4 | 5 | 6 | 7 |
| DATE | 4/3 | 4/15 | 4/19 | 4/20 | 5/5 | 5/6 | 5/30 |
| ITEM | pen | pen | pad | cup | hat | hat | pin |

In this example of an RPT hybrid table, the row of "* FIRST RANGE PARTITION *" is created by the syntax used to create a partition in the language, or code, of the RDBMS used to crate and manage the table.

Some code which may be used to create a range partitioned table, in one type of commercial relational database software, will now be set forth in this paragraph. In this example the RPT includes one row and one column based partition:

```
create table fidata_row(
    sale integer not null,
    date timestamp not null,
    item varchar(20) not null)
    organize by row;
create table fidata(
    sale integer not null,
    date timestamp not null,
    item varchar(20) not null)
    organize by column
    partition by(date)
    (starting (MINVALUE) ending ('12/31/2013'));
alter table fidata attach partition starting from ('1/1/2014')
    ending (MAXVALUE) from fidata_row;
```

It is noted that the creation of table fidata returns an error at the moment in DB2 since range partitioning is not supported by column oriented tables.

In the above example, the hybrid table is realized with one range partitioned table. In this example and as shown above, one row of the table is used to store data corresponding to the partition. Alternatively, the partition could be in the form of a column so that the older data would be located to the right of the current data (rather than below the current data as in the example of the previous paragraph). In the example of the previous paragraph, at the end of every month, the hybrid table is revised so that: (i) the data of the previous month is changed from being stored in a row oriented manner to a column oriented manner; (ii) the partition is revised as may be necessary depending upon the way the particular relational database management software works; and (iii) the data of the immediately previous month (now stored in a column oriented manner) is located to be in the same column oriented partition as data from earlier months. In some embodiments, the complete range previously known as fidata_row is converted from row to column in one step, as shown by the following example code:
db2convert -d <dbname> -t fidata_row
This would require creation of a new range for the row based part of the table. Alternatively, data from every month, other than the current month, may be stored in a separate partition, but each of these partitions will be column oriented partitions (unless there is some system design related reason to have some combination of row and column oriented partitions with respect to data of some of the earlier months).

Some RPT embodiments of the present invention may include one, or more, of the following features, characteristics and/or advantages: (i) data is first inserted in the row oriented part of the table and moved to the column oriented part in background; (ii) one column of the table is identified to partition the table (if none can be found a hidden column can be used); (iii) Selects, Updates and Deletes are done in both parts; (iv) fast inserts into row-based table; (v) fast reporting on column-based table; (vi) the data has to be stored only once; (vii) because all parts emerging to this "side car solution" exist in most (perhaps even all) commercial database systems, this can be constructed transparently; (viii) no further components are needed; and/or (ix) transparent for applications because they can access current data from the RPT type hybrid table in the same way that data is accessed from a conventional row-based table.

Union type embodiments of the present invention will now be discussed in the following paragraphs.

Figure 4:
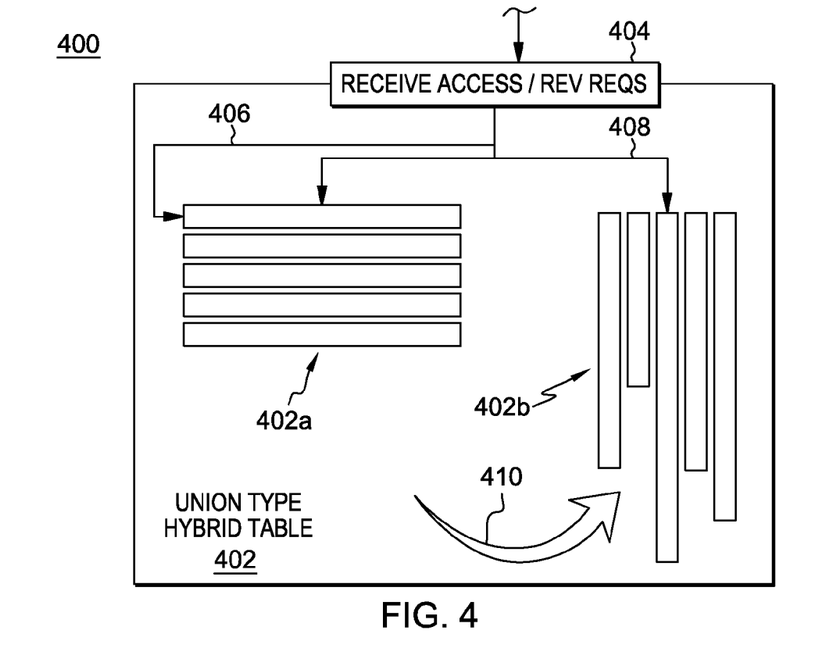
FIG. 4 is a schematic view of a second embodiment of a system according to the present invention.

As shown in FIG. 4, union type hybrid table system 400 includes: union type hybrid table 402 (including row oriented portion 402a and column oriented portion 402b); receive access/revision requests block 404; insert/delete (trigger based) request communication path 406; select/delete request communication path 408; and background data move indicator 410. Path 406 is used to communicate insert and update requests or commands to row oriented portion 402a. Path 408 is used to communicate select and delete requests or commands to row oriented portion 402a and/or column oriented portion 402b. Because of the "union all view" type syntax used to create and maintain table 402, in this embodiment, the row and column oriented portions are represented as one single table.

An examples of code to an example union type embodiment will now be set forth:

```
create table fidata_row(
    sale integer not null,
    date timestamp not null,
    item varchar(20) not null)
    organize by row;
create table fidata_col(
    sale integer not null,
    date timestamp not null,
    item varchar(20) not null)
    organize by column;
create view fidata as
    select * from fidata_row
union all
    select * from fidata_col;
```

Results from tests conducted using system 400 indicate as follows: (i) single insert into row-based tables by factor 12 faster than single inserts into column-based tables; (ii) block movement from row-based to column-based table—1000 rows at one time—nearly as fast as 1000 single inserts into row-based table; (iii) test query was 7 times faster on column-based table than on row-based table; and (iv) test query on mixed-mode table consisting of row-based table with 10% contents and column-based table with 90% contents is only 15% slower than standalone column-based table.

Some additional comments concerning union type embodiment 400 are as follows: (i) data is first inserted in the row-based part of the table and moved to the column-based part in background (as shown by arrow 410); (ii) selects and deletes are done in both parts if the required rows exist in that part; (iii) rows to be updated can first be deleted from the column-based part and afterwards inserted in the row-based part by using appropriate union all view type syntax instead of triggers; (iii) fast inserts into row-based table; (iv) fast reporting on column-based table; (v) the data has to be stored only once; (vi) because all parts required by this side car solution exist in all commercial database systems, this can be constructed transparently; (vii) transparent for applications, such as business intelligence warehouse type applications; (viii) SELECT is performed using WITH CS+CC instead of WITH UR; (ix) the system designer should take care so that secondary indexes do not cause a problematic level of performance degradations; (x) secondary indexes may have to be built on both tables (there are two tables that make the third one—the combination of one row and one column-based table is needed for the union all view); and/or (xi) during update, insert, delete and select operations, both indexes may have to be accessed and updated.

The performance of "deletes" in union type embodiment 400 will now be discussed. In this embodiment, these deletes are implemented with an "instead of delete trigger" on the view using the following code:

```
CREATE OR REPLACE TRIGGER COLUMNS_DELETE INSTEAD
OF DELETE ON COLUMNS REFERENCING OLD AS OLD_ROW
FOR EACH ROW
BEGIN ATOMIC
DELETE FROM COLUMNS_ROW WHERE
    COLUMNS_ROW."I_1" = OLD_ROW."I_1" AND
    COLUMNS_ROW."..." = OLD_ROW."..." AND
    COLUMNS_ROW."I_N" = OLD_ROW."I_N";
DELETE FROM COLUMNS_COL WHERE
    COLUMNS_COL."I_1" = OLD_ROW."I_1" AND
    COLUMNS_COL."..." = OLD_ROW."..." AND
    COLUMNS_COL."I_N" = OLD_ROW."I_N";
END
```

The performance of "updates" in union type embodiment 400 will now be discussed. In this embodiment, these updates are implemented with an "instead of update" trigger on the view using the following code:

```
CREATE OR REPLACE TRIGGER COLUMNS_UPDATE INSTEAD
OF UPDATE ON COLUMNS REFERENCING OLD AS OLD_ROW
NEW AS NEW_ROW FOR EACH ROW
BEGIN ATOMIC
DELETE FROM COLUMNS_ROW WHERE
COLUMNS_ROW."I_1" = OLD_ROW."I_1" AND
COLUMNS_ROW."..." = OLD_ROW."... AND
COLUMNS_ROW."I_N" = OLD_ROW."I_N"; DELETE FROM
COLUMNS_COL WHERE COLUMNS_COL."I_1" =
OLD_ROW."I_1" AND COLUMNS_COL."..." = OLD_ROW."..."
AND COLUMNS_COL."I_N" = OLD_ROW."I_N"; INSERT INTO
COLUMNS_ROW (I_1, ..., I_N) VALUES (
    NEW_ROW."I_1",
    NEW_ROW."...",
    NEW_ROW."I_N",
    ...
);
END
```

The performance of "inserts" in union type embodiment 400 will now be discussed. In this embodiment, these inserts are implemented with an "instead of insert" trigger on the view using the following code:

```
CREATE OR REPLACE TRIGGER COLUMNS_INSERT INSTEAD
OF INSERT ON COLUMNS REFERENCING NEW AS NEW_ROW
FOR EACH ROW
BEGIN ATOMIC
```

```
IF NOT EXISTS (SELECT * FROM COLUMNS_COL WHERE
    NEW_ROW."I_1" = COLUMNS_COL."I_1" AND
    NEW_ROW."..." = COLUMNS_COL."..." AND
    NEW_ROW."I_N" = COLUMNS_COL."I_N")
THEN
    INSERT INTO COLUMNS_ROW (I_1, ..., I_N, ...)
    VALUES ( NEW_ROW."I_1", NEW_ROW."...",
    NEW_ROW."I_N", ...)
ELSE -- FORCE SQL0803N
    SIGNAL SQLSTATE '23505'
        SET MESSAGE_TEXT = 'DUPREC';
END IF;
END
```

The algorithm that moves the data in this embodiment duly considers the following points: (i) the workload (for example, if the workload is insert based the data can be moved as soon as possible, if the workload is update based more data can be kept in the row based table); (ii) the time of insert; (for example, if the data that was inserted in the last month is updated very frequently compared to other months this can be kept in the row based table); (iii) the algorithm should be adaptable for these points; (iv) to support the movement based on time the row based table could be realized as System Insert Time Clustered Table.

Figure 5:
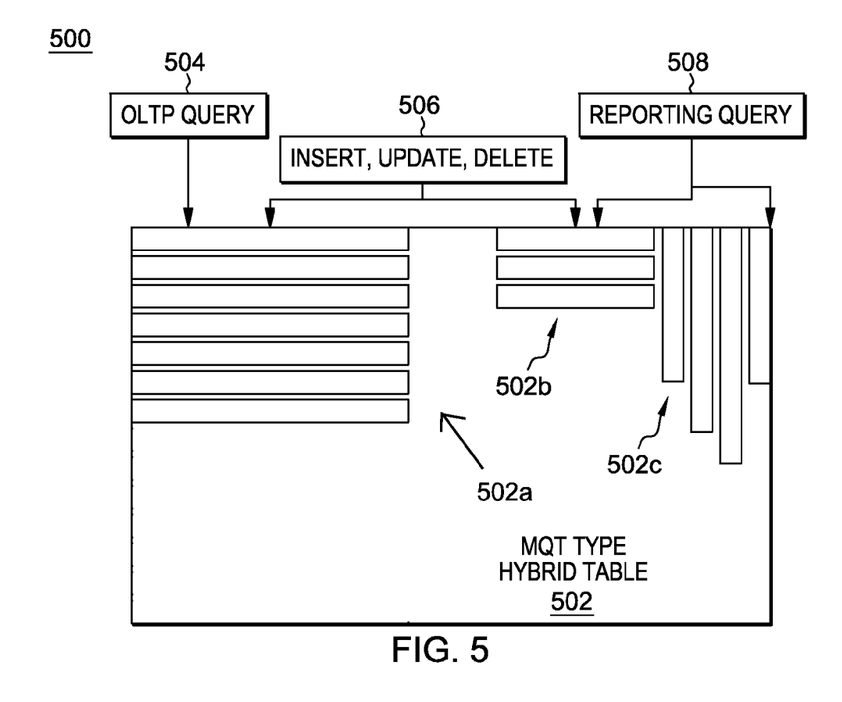
FIG. 5 is a schematic view of a third embodiment of a system according to the present invention.

As shown in FIG. 5, Materialized Query Tables (MQT) type system 500 includes: MQT type hybrid table 502 (including row oriented portion 502a, staging portion 502b and column oriented portion 502c); OLTP query block 504; insert/update/delete block 506; and reporting query block 508. As those of skill in the art will understand, an MQT is a database object that contains the results of a query. For example, it may be: (i) a local copy of data located remotely; (ii) a subset of the rows and/or columns of a table or join result; or (iii) a summary based on aggregations of a table's data. MQTs, which store data based on remote tables, are also known as "materialized views." OLTP stands for online transaction processing and means short and directly executed transactions with a small result set and a high number of insert, update and delete operations. This higher number of data manipulations do benefit from a row based table in comparison to a column-based table.

Example code for creating the tables of an MQT type embodiment will now be set forth:

```
create table fidata_row(
    sale integer not null,
    date timestamp not null,
    item varchar(20) not null)
    organize by row;
create table fidata_col(
    sale, date, item)
    as (select * from employee) data initially deferred
    refresh immediate
        enable query optimization
        maintained by system
        organize by column;
```

In this example code, the second step shows the creation of the materialized query table.

In MQT embodiment 500: (i) the hybrid MQT type table consists of a row based sub-table ("sub-tables" are sometimes herein referred to as tables) and a column based materialized query table for this table; (ii) each row to be inserted is inserted in both the row based table and the staging table needed for replay on the MQT; (iii) updates and deletes are done in the row based table and recorded in the staging table for replay on the MQT; (iv) the replay of all operations recorded in the staging table is done asynchronously on the column based MQT table; (v) the data in both parts, row based table and column based MQT table are nearly in sync (except the data that is stored in the staging table); (vi) OLTP queries can be run on the row based table; (vii) reporting queries can be run on the MQT with or without the data in the staging table; and (viii) the data is stored twice and needs more space. With respect to item (viii), some MQT type embodiments may be designed to store the data only once, unlike MQT type embodiment 500.

Some embodiments of the present invention may be implemented by something similar to a new "create table" command (for example, a "create table" command in DB2). In these embodiments, this new "create table" command may handle the complete setup in the background, including the mechanisms that move the data from the row to the column-oriented part of the combination table. In some embodiments, it is possible for end users to create the combination table (for example, in SAP space, a report feature similar to the end user selectable feature will set up the combination table). Some embodiments of the present invention include the following command syntax: ORGANIZE BY COLUMN WITH ROW FOR RECENT DATA (or the like).

Some embodiments of the present invention may include one, or more, of the following features, characteristics and/or advantages: (i) partition only temporarily in one row partition and column partitions while the row partition is converted to a column partition after a certain time; (ii) rather than being hard coded in the system, uses features of database software that are usable in a "standalone" fashion; (iii) no data is stored twice, data is either stored row oriented or column oriented; (iv) can be implemented using only features of databases that are generally available in RDBMSes; and/or (v) combines features present in common RDBMSes to obtain a hybrid table.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Partition range: an area within a table between: (i) a partition and an end of the table; or (ii) between two consecutive partitions.

Storing: storing data (such as data of a table) on a volatile or non-volatile machine readable storage device.

Attribute value: may be a null, or missing, value.

Table: includes within its scope: (i) data structures conventionally understood as "tables" in the relevant art, (ii) a hybrid table, whether, or not, the hybrid table is made up of multiple "tables" (as that term is conventionally understood), and (iii) views (such as UNION ALL views), whether, or not, the view includes multiple "tables" (as that term is conventionally understood).

What is claimed is:

1. A computer program product for storing data in a tabular form, the computer program comprising:
   a machine readable storage device; and
   computer code stored on the machine readable storage device, with the computer code including instructions for causing a processor(s) set to perform operations including the following:
   creating a table with a set of one, or more, partitions such that the table includes at least a first partition range and a second partition range,
   populating the first partition range with a first data set that includes a first plurality of records, with each record of the first plurality of records having a plurality of attribute values corresponding to a plurality of ordered attributes,
   populating the second partition range with a second data set that includes a second plurality of records, with each record of the second plurality of records having a plurality of attribute values corresponding to a plurality of ordered attributes, and
   storing the table as a machine readable data structure on a non-transitory storage medium of a machine readable storage device by transforming matter of a storage medium of a machine readable data storage device to correspond to the table data structure,
   wherein:
   the plurality of ordered attributes of the first plurality of records has the same attributes and the same order as the plurality of ordered attributes of the second plurality of records;
   the first plurality of records is stored on the storage medium of the machine readable storage device in a row oriented manner; and
   the second plurality of records is stored on the storage medium of the machine readable storage device in a column oriented manner;
   whereby selective use two different orientations for the first and second pluralities of records improves, relative to a single orientation table, a balance between the following design imperatives: speed of stored data access and storage space efficiency.

2. The computer program product of claim 1 wherein:
   no record of the first plurality of records has an identical set of attribute values as any record of the second plurality of records.

3. The computer program product of claim 1 wherein the creation of the table and the population of the first and second partition ranges is controlled by relational database management system software.

4. The computer program product of 1 wherein:
   the first plurality of records include records most likely to be revised with respect to their attribute records and/or augmented with additional records.

5. The computer program product of 1 wherein:
   the second plurality of records include attribute values most likely to be queried.

6. The computer program product of claim 1 wherein the records of the first plurality of records is more recent than the records of the second plurality of records.

7. The computer program product of claim 1 further comprising:
   the processor(s) set;
   wherein the computer program product is in the form of a computer system.

8. A computer program product for storing data in a tabular form, the computer program product comprising:
   a machine readable storage device; and
   computer code stored on the machine readable storage device, with the computer code including instructions for causing the processor(s) set to perform operations including the following:
   creating a first table and a second table,
   populating the first table with a first data set that includes a first plurality of records, with each record of the first plurality of records having a plurality of attribute values corresponding to a plurality of ordered attributes,
   populating the second table with a second data set that includes a second plurality of records, with each record of the second plurality of records having a plurality of attribute values corresponding to a plurality of ordered attributes,
   in response to a union all view command, creating a third table that includes both the first plurality of records and the second plurality of records, and
   storing the third table as a machine readable data structure on a non-transitory storage medium of a machine readable storage device by transforming matter of a storage medium of a machine readable data storage device to correspond to the table data structure,
   wherein:
   the plurality of ordered attributes of the first plurality of records has the same attributes and the same order as the plurality of ordered attributes of the second plurality of records;
   the first plurality of records is stored on the storage medium of the machine readable storage device in a row oriented manner in both the first table and the third table; and
   the second plurality of records stored on the storage medium of the machine readable storage device in a column oriented manner in both the second table and the third table;
   whereby selective use two different orientations for the first and second pluralities of records improves, relative to a single orientation set of tables, a balance between the following design imperatives: speed of stored data access and storage space efficiency.

9. The computer program product of claim 8 wherein:
   no record of the first plurality of records has an identical set of attribute values as any record of the second plurality of records.

10. The computer program product of claim 8 wherein the creation of the first, second and third tables is controlled by relational database management system software.

11. The computer program product of 8 wherein:
   the first plurality of records include records most likely to be revised with respect to their attribute records and/or augmented with additional records.

12. The computer program product of 8 wherein:
   the second plurality of records include attribute values most likely to be queried.

13. The computer program product of claim 8 wherein the records of the first plurality of records is more recent than the records of the second plurality of records.

14. The computer program product of claim 8 further comprising:
   the processor(s) set;
   wherein the computer program product is in the form of a computer system.

\* \* \* \* \*